(12) United States Patent
Kim

(10) Patent No.: US 10,808,793 B2
(45) Date of Patent: Oct. 20, 2020

(54) HYDRAULIC TRANSMISSION MOUNT AND METHOD OF MANUFACTURING THE SAME

(71) Applicants: Hyundai Motor Company, Seoul (KR); Kia Motors Corporation, Seoul (KR)

(72) Inventor: Seung-Won Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 178 days.

(21) Appl. No.: 16/169,896

(22) Filed: Oct. 24, 2018

(65) Prior Publication Data

US 2020/0063823 A1 Feb. 27, 2020

(30) Foreign Application Priority Data

Aug. 23, 2018 (KR) .................. 10-2018-0098841

(51) Int. Cl.
| | |
|---|---|
| *F16F 13/00* | (2006.01) |
| *F16F 13/16* | (2006.01) |
| *F16F 13/14* | (2006.01) |
| *F16F 13/10* | (2006.01) |

(52) U.S. Cl.
CPC ............ *F16F 13/16* (2013.01); *F16F 13/101* (2013.01); *F16F 13/103* (2013.01); *F16F 13/1463* (2013.01)

(58) Field of Classification Search
CPC ...... F16F 13/101; F16F 13/103; F16F 13/107; F16F 13/08; F16F 13/085; F16F 13/10
See application file for complete search history.

(56) References Cited

U.S. PATENT DOCUMENTS

| | | | | | |
|---|---|---|---|---|---|
| 4,673,169 | A | * | 6/1987 | Heitzig ............... | F16F 13/14 248/566 |
| 5,263,815 | A | * | 11/1993 | Brenner ............... | F16F 13/06 180/300 |
| 2009/0321202 | A1 | | 12/2009 | Hamada et al. | |

(Continued)

FOREIGN PATENT DOCUMENTS

| | | |
|---|---|---|
| JP | 62-205859 A | 9/1987 |
| KR | 10-1998-0050213 A | 9/1998 |

(Continued)

*Primary Examiner* — Nicholas J Lane
(74) *Attorney, Agent, or Firm* — Morgan, Lewis & Bockius LLP

(57) ABSTRACT

A hydraulic transmission mount which isolates noise or vibration of an engine, the hydraulic transmission mount may include a core which moves horizontally together with a main rubber vulcanized outside the core in accordance with behavior of a vehicle; stoppers which are coupled to both surfaces of the core and define a hermetic liquid chamber with the core; a bracket which surrounds the stoppers and fixes the hydraulic transmission mount to a vehicle body; and a spoke which penetrates an insertion hole formed at a center of the core and has protruding regions that are bent at both end portions of the spoke and in contact with the stoppers, wherein a fluid encapsulated in the liquid chamber flows through the insertion hole in accordance with the behavior of the vehicle.

15 Claims, 15 Drawing Sheets

(56) References Cited

U.S. PATENT DOCUMENTS

| | | | | |
|---|---|---|---|---|
| 2013/0175745 A1* | 7/2013 | Kojima | ................... | F16F 13/18 |
| | | | | 267/140.13 |
| 2013/0264756 A1* | 10/2013 | Daito | ..................... | F16F 13/08 |
| | | | | 267/140.13 |
| 2016/0215845 A1* | 7/2016 | Kudla | ..................... | F16F 13/24 |

FOREIGN PATENT DOCUMENTS

| | | | |
|---|---|---|---|
| KR | 10-1998-0061232 A | 10/1998 | |
| KR | 10-1998-0061233 A | 10/1998 | |
| KR | 10-2013-0000874 | 1/2013 | |
| KR | 10-2013-0055112 A | 5/2013 | |
| KR | 10-2013-0068133 A | 6/2013 | |

\* cited by examiner

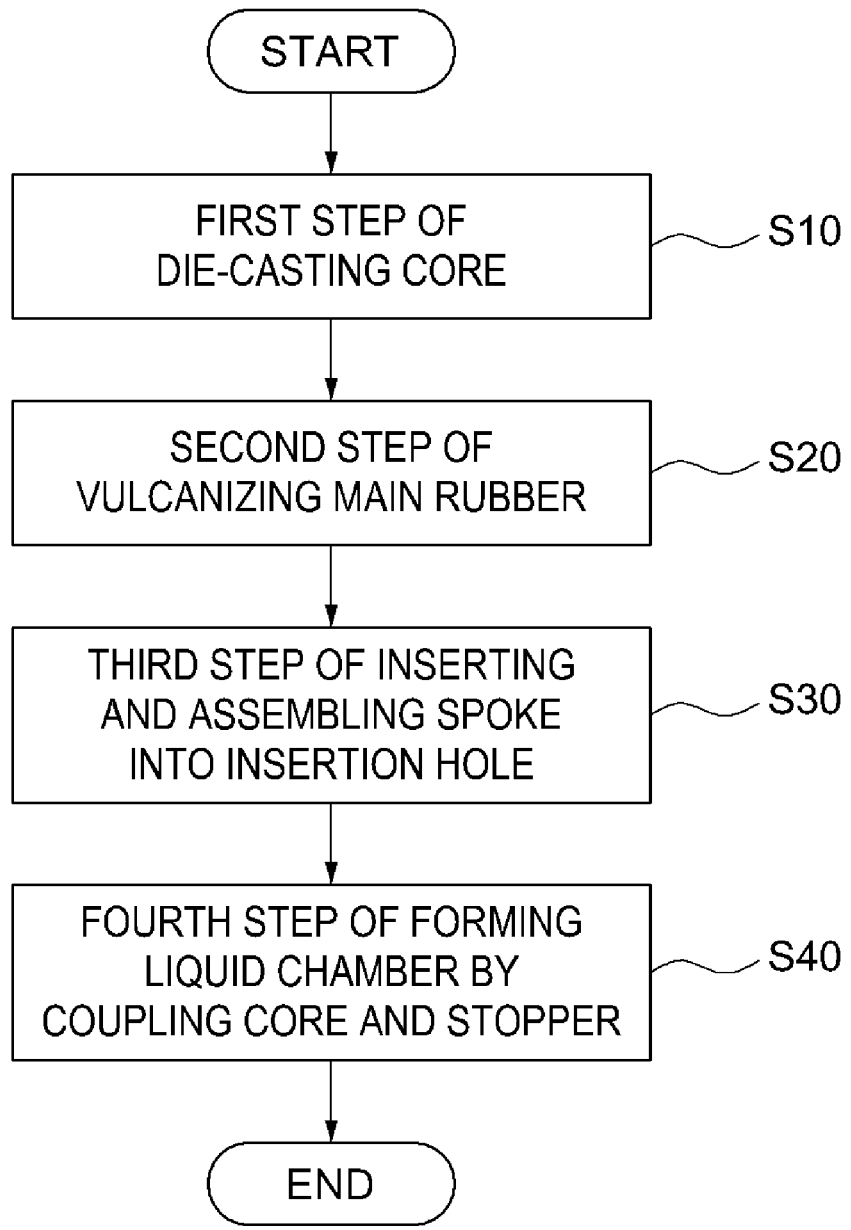

HYDRAULIC TRANSMISSION MOUNT AND METHOD OF MANUFACTURING THE SAME

CROSS-REFERENCE TO RELATED APPLICATIONS

The present application claims priority to Korean Patent Application No. 10-2018-0098841, filed on Aug. 23, 2018, with the Korean Intellectual Property Office, the entire contents of which is incorporated herein for all purposes by this reference.

BACKGROUND OF THE INVENTION

Field of the Invention

The present invention relates to a hydraulic transmission mount, which isolates vibration and noise of an engine of a vehicle, and a method of manufacturing the same, and particularly, to a hydraulic transmission mount, which utilizes a flow of a fluid to provide an operation mode suitable for a situation in which a vehicle accelerates, and a method of manufacturing the same.

Description of Related Art

In general, engine vibration, which occurs within a particular RPM region when a vehicle travels, has a particular frequency and is transmitted to an internal of a vehicle through a vehicle body, and an explosion component in an engine dominantly affects the internal of the vehicle.

A transmission of the vehicle refers to a device which transmits power from the engine to driving wheels while changing rotational force and a speed so that the rotational force and the speed are suitable for a traveling state of the vehicle, and the transmission is directly connected to a crank shaft in the engine through a clutch. A large amount of vibration and a large amount of noise occur due to influences of a mechanical operation of the transmission and an operation of the engine.

Therefore, a transmission mount is used when mounting the transmission on the vehicle body to improve noise, vibration & harshness (NVH) performance and ride quality of an occupant in the vehicle by minimizing transmission of vibration and noise generated from the engine and the transmission.

In this regard, Korean Patent Application Laid-Open No. 10-2013-0000874 (Breaking Type Tm Mount Bracket For Improving Crashworthiness) in the related art relates to a transmission mount mounted on a transmission of a vehicle and discloses a structure of a transmission mount which improves a collision performance by ensuring a sufficient deformation section of a vehicle body by fracturing a front bracket by use of a fracturable transmission mount bracket at the time of a vehicle collision, and improves a collision performance by dispersing collision energy by allowing a front bracket body having a wedge shape to rotate the transmission mount bracket.

However, the technology in the related art has a problem in that an effect of isolating vibration deteriorates because an insulator is only made of rubber such that properties of the mount are rapidly changed at the time of sudden unintended acceleration of the vehicle or at the time of a vehicle collision.

In this regard, Korean Patent Application Laid-Open No. 10-2013-0055112 (Hydraulic Transmission Mount) in the related art relates to a hydraulic transmission mount and discloses a structure of a hydraulic transmission mount in which liquid chambers filled with a fluid are provided in an insulator, and the fluid flows between the liquid chambers, such that an effect of isolating vibration is improved.

However, the technology in the related art has a problem in that a gap between the insulator and a bracket is not maintained due to deformation in the insulator, and thus the insulator collides with the bracket again, which causes impact exerted on a vehicle.

FIG. 1 illustrates a structure of a transmission mount in the related art. Referring to FIG. 1, a mount 100 includes an insulator 120 which is made of a rubber material and surrounds an internal core 130, and a mounting bracket 110 which surrounds the insulator 120 and fixes the mount 100 to a vehicle body.

A liquid chamber unit 122, which is filled with a fluid, is positioned at a lower side of the insulator 120, and vibration or noise of a vehicle is reduced as the fluid flows.

The structure of the transmission mount in the related art has a problem in that a vibration isolation performance deteriorates because the insulator 120 only made of rubber is rapidly deformed due to inertial force and force required to isolate vibration is rapidly changed when impact is exerted on the vehicle in front and rear directions or the vehicle suddenly and unintentionally accelerates or rapidly brakes.

A gap at one side between the insulator 120 and the mounting bracket 110 is decreased due to deformation of the insulator 120, and in the instant case, a gap at the other side is increased to the contrary. After the sudden unintended acceleration or the rapid braking of the vehicle, the increased gap rather causes the insulator 120 to exert large impact on the mounting bracket 110 through a long stroke, and as a result, there is a problem in that the mount 100 cannot sufficiently isolate vibration and the vehicle is not strong against impact.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a hydraulic transmission mount which improves a vibration and noise isolation performance of a vehicle at the time of a collision or sudden unintended acceleration of the vehicle by maintaining a gap between a bracket for fixing a mount on a vehicle body and an insulator disposed in the bracket in a transmission mount in the related art, and a method of manufacturing the same.

Various aspects of the present invention are directed to providing a hydraulic transmission mount which isolates noise or vibration of an engine, the hydraulic transmission mount including: a core which moves horizontally together with a main rubber vulcanized outside the core in accordance with behavior of a vehicle; stoppers which are coupled to both surfaces of the core and define a hermetic liquid chamber with the core; a bracket which surrounds the stoppers and fixes the hydraulic transmission mount to a vehicle body; and a spoke which penetrates an insertion hole formed at a center of the core and has protruding regions that are bent at both end portions of the spoke and in contact with the stoppers, in which a fluid encapsulated in the liquid chamber flows through the insertion hole in accordance with the behavior of the vehicle.

The stoppers may be deformed by the movement of the core that occurs in accordance with the behavior of the vehicle.

Multiple coupling protrusions may be formed on both surfaces of the core.

The hydraulic transmission mount may further include steel plates which have coupling holes to be coupled to the coupling protrusions and are coupled between the core and the stoppers.

The spoke may maintain a horizontal gap between the bracket and the stoppers.

The spoke may have a predetermined length to prevent the core from being withdrawn from the bracket.

Various aspects of the present invention are directed to providing a method of manufacturing a hydraulic transmission mount that isolates noise or vibration of an engine, the method including: a first step of die-casting a core that moves horizontally in accordance with behavior of a vehicle; a second step of vulcanizing a main rubber so that the main rubber surrounds the core; a third step of inserting and assembling a divided spoke into an insertion hole formed at a center of the core; and a fourth step of forming a hermetic liquid chamber in stoppers by coupling the stoppers and the core in a liquid.

The third step may include coupling and assembling one portion of the spoke formed with an assembling protrusion and the other portion of the spoke formed with an assembling groove.

The method may further include coupling steel plates to the core after the third step.

The method may further include coupling a floor plate to the main rubber and press-fitting the main rubber into a bracket after the fourth step.

According to an exemplary embodiment of the present invention configured as described above, a vibration isolation performance is maximized when a vehicle slowly accelerates, and a performance of controlling behavior of a power train is maximized when the vehicle rapidly accelerates, such that there is an advantage in that an operation mode may vary in accordance with a situation in which the vehicle accelerates.

The present invention is advantageous in that since a flow path is formed in the mount, a performance of isolating vibration generated from the engine of the vehicle is excellent.

The present invention is advantageous in that a collision performance of the vehicle may be improved by preventing withdrawal of the mount at the time of a vehicle collision.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 8 illustrates a flowchart of a method of manufacturing the hydraulic transmission mount of the present invention.

Figure 1:
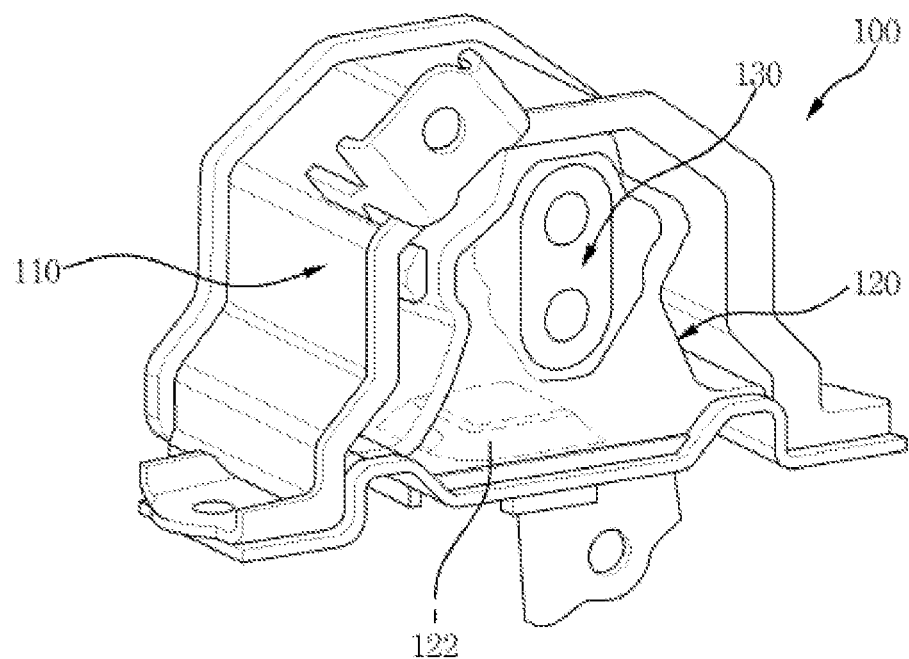
FIG. 1 illustrates a structure of a transmission mount in the related art.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the other hand, the invention(s) is/are intended to cover not only the exemplary embodiments, but also various alternatives, modifications, equivalents and other embodiments, which may be included within the spirit and scope of the invention as defined by the appended claims.

An object and an effect of the present invention may be naturally understood or may become clearer from the following description, and the object and an effect of the present invention are not restricted only by the following description. Furthermore, in the description of the present invention, the specific descriptions of publicly known technologies related with the present invention will be omitted when it is determined that the specific descriptions may unnecessarily obscure the subject matter of the present invention.

Figure 2:
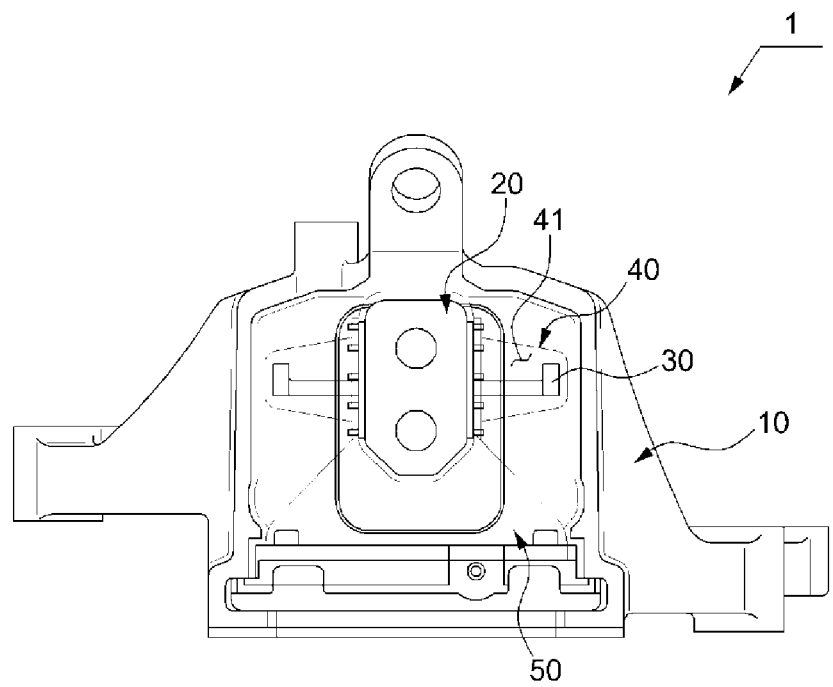
FIG. 2 illustrates a structure of a hydraulic transmission mount of the present invention.

FIG. 2 illustrates a structure of a hydraulic transmission mount 1 of the present invention. Referring to FIG. 2, the core 20 is connected to a transmission and is configured to support the transmission, and the core 20 may be moved horizontally in accordance with behavior of the vehicle.

Metal such as aluminum may be used as a material of the core 20 so that the core 20 is easily coupled to a vehicle body, but the material of the core 20 is not limited thereto. A main rubber 50, which is an elastic body made of a rubber material, may be vulcanized outside the core 20 to surround the core 20 to isolate vibration of the vehicle.

Stopper 40 are coupled to both surfaces of the core 20 having the vulcanized main rubber 50, and a hermetic liquid chamber 41 may be formed between the stopper 40 and the core 20.

The stopper 40 is made of an elastic body such as rubber to isolate vibration of the vehicle and may be deformed in accordance with the behavior of the vehicle or the movement of the core 20. A fluid encapsulated in an internal space of the stopper 40 flows from one side stopper 40 to the other side stopper 40 in accordance with the behavior of the vehicle, and vibration of the vehicle may be isolated by frictional force generated by resistance of the fluid generated during the flow of the fluid.

An anti-freezing liquid may be used as the fluid in the liquid chamber 41 to prevent the fluid from being frozen when an atmospheric temperature outside the vehicle is low and to prevent the engine and accessory devices in the vehicle from being overheated, but the fluid is not limited to the anti-freezing liquid.

A bracket 10 may surround the stoppers 40 and the main rubber 50 to fix the hydraulic transmission mount 1 to the vehicle body.

A spoke 30, which has a thin bar shape and penetrates an insertion hole 23 formed at a center of the core 20, is coupled at the center of the core 20, and protruding regions are bent at both end portions of the spoke 30 and may be in contact with both sides in the stoppers 40.

The protruding regions each may have a vertical length greater than a diameter of the insertion hole 23 so that the spoke 30 is not withdrawn from the insertion hole 23 even though the core 20 moves.

A material of the spoke 30 may be metal so that the spoke 30 is not easily deformed by the behavior of the vehicle or the movement of the core 20, and synthetic resin may be used to reduce weight of the components, but the material of the spoke 30 is not limited thereto.

As the vehicle behaves, the core 20 moves horizontally along the spoke 30, and the fluid encapsulated in the liquid chamber 41 may flow to the other side stopper 40 through the insertion hole 23.

In an exemplary embodiment of the present invention, the stoppers 40 include a first stopper 410 and a second stopper 420, the hermetic liquid chambers 41 include a first hermetic liquid chamber 412 enclosed by the core 20 and the first stopper 410 and a second hermetic liquid chamber 414 enclosed by the core 20 and the second stopper 420. The first hermetic liquid chamber 412 and the second hermetic liquid chamber 414 fluidically-communicate with each other through the insertion hole 23.

The spoke 30 is mounted through the insertion hole 23, a first end of the spoke 30 is connected to the first stopper 410 and a second end of the spoke 30 is connected to the second stopper 420.

Figure 3:
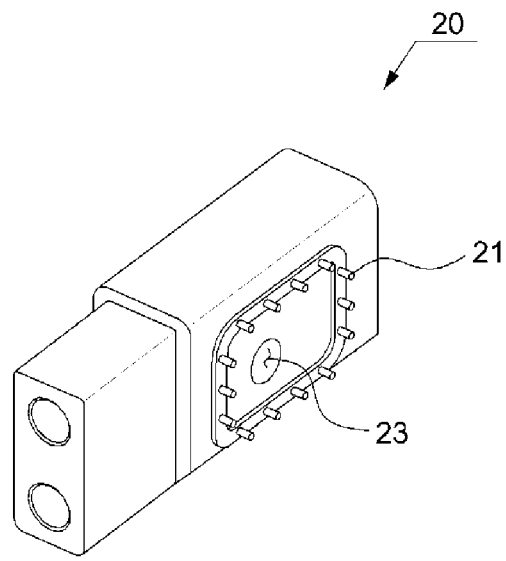
FIG. 3 illustrates a core of the present invention.

FIG. 3 illustrates the core 20 of the present invention. Referring to FIG. 3, multiple coupling protrusions 21 may be formed on both surfaces of the core 20 so that the core 20 is coupled to the stoppers 40.

The insertion hole 23 is formed at the center of the core 20, the spoke 30 is penetratively coupled to the insertion hole 23, and the insertion hole 23 may define a flow path through which the fluid in the stoppers 40 may flow.

Figure 4A:
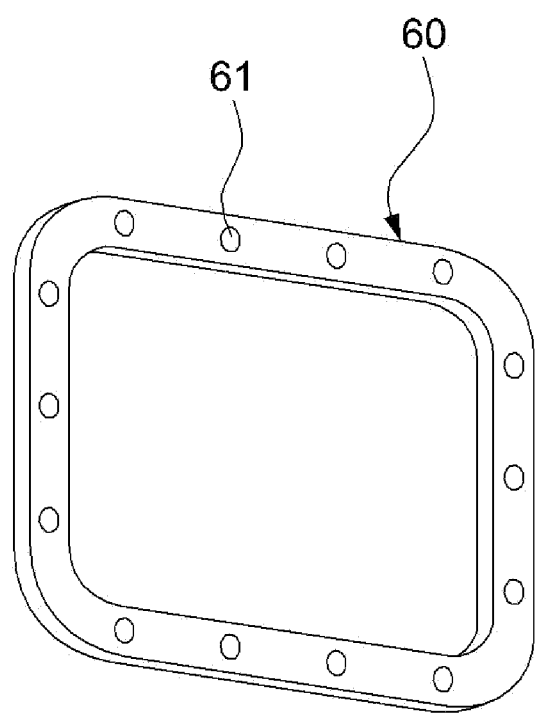
FIG. 4A illustrates a steel plate of the present invention.
Figure 4B:
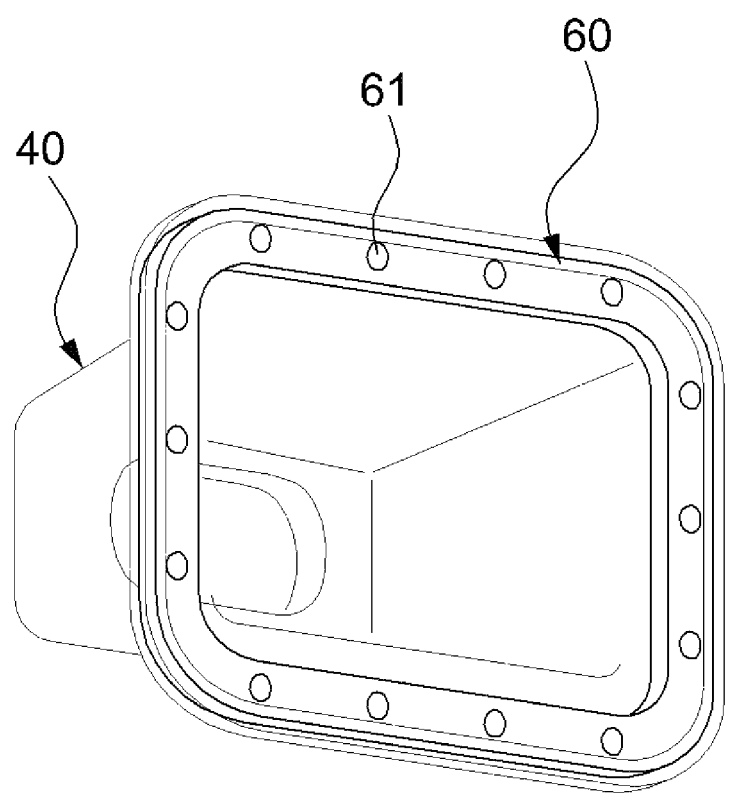
FIG. 4B illustrates a state in which the steel plate of the present invention is coupled to a stopper.

FIG. 4A and FIG. 4B illustrate steel plates 60 of the present invention. Referring to FIG. 4A, coupling holes 61, which are coupled to the coupling protrusions 21, may be formed in the steel plates 60.

A material of the steel plate 60 may be metal such as iron or aluminum so that the coupling holes 61 may be coupled to the coupling protrusions 21 by riveting, but the material of the steel plate 60 is not limited thereto.

Referring to FIG. 4B, a cross section of the steel plate 60 has the same shape as a cross section of the stopper 40, and the steel plate 60 is formed to be smaller than the stopper 40, such that the steel plate 60 may be fitted into the stopper 40 without a gap. In the instant case, the stopper 40 made of an elastic body such as rubber may define a rubber membrane at an edge portion of the steel plate 60.

The steel plate 60, which is fitted with the edge portion in the stopper 40, may be coupled between the core 20 and the stopper 40 as the coupling holes 61 are coupled to the coupling protrusions 21.

Figure 5A:
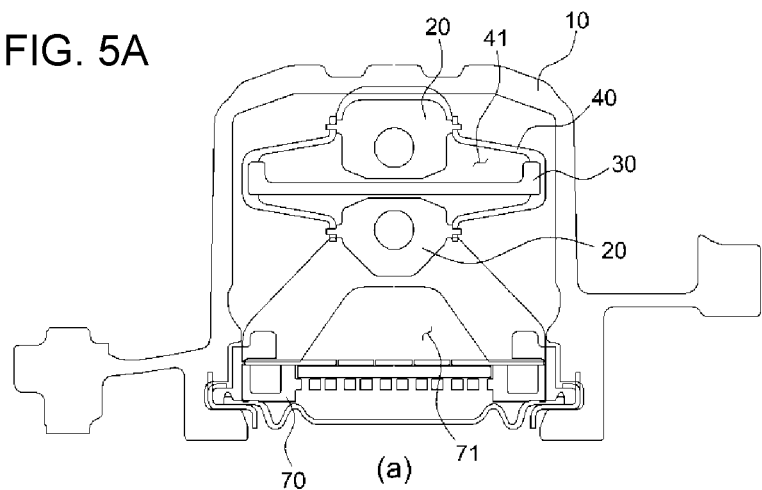
FIG. 5A illustrates an appearance of the hydraulic transmission mount of the present invention when a vehicle is stopped.

FIG. 5A illustrates an appearance of the hydraulic transmission mount 1 of the present invention when the vehicle is stopped. Referring to FIG. 5A, the stoppers 40 may be coupled to the core 20 while maintaining a horizontal gap between the bracket 10 and the stoppers 40.

Figure 5B:
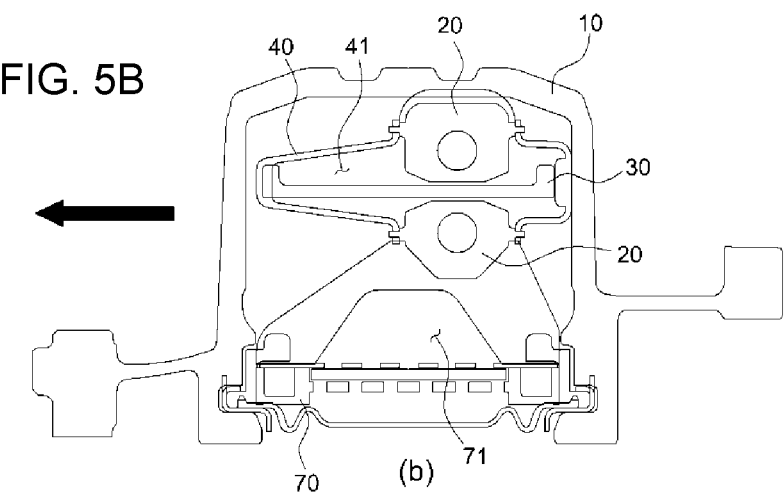
FIG. 5B illustrates an appearance of the hydraulic transmission mount of the present invention when the vehicle suddenly and unintentionally accelerates.

FIG. 5B illustrates the behavior of the hydraulic transmission mount 1 of the present invention when the vehicle suddenly and unintentionally accelerates. Referring to FIG. 5B, when the vehicle suddenly and unintentionally accelerates in the arrow direction thereof, the core 20 is moved along the spoke 30 by inertial force in a direction opposite to the acceleration direction of the vehicle, such that the stoppers 40 and the main rubber 50 connected to the core 20 may be deformed.

The one side stopper 40 is extended, and the other side stopper 40 is compressed, but a horizontal length of the spoke 30 in the stoppers 40 is maintained because the material of the spoke 40 is not deformed in accordance with the behavior of the vehicle, such that the deformation of the stoppers 40, which surround the spoke 30, is restricted. Despite the sudden unintended acceleration of the vehicle, the spoke 30 maintains a horizontal gap between the bracket 10 and the stopper 40 so that the gap is similar to the gap when the vehicle is stopped.

Figure 5C:
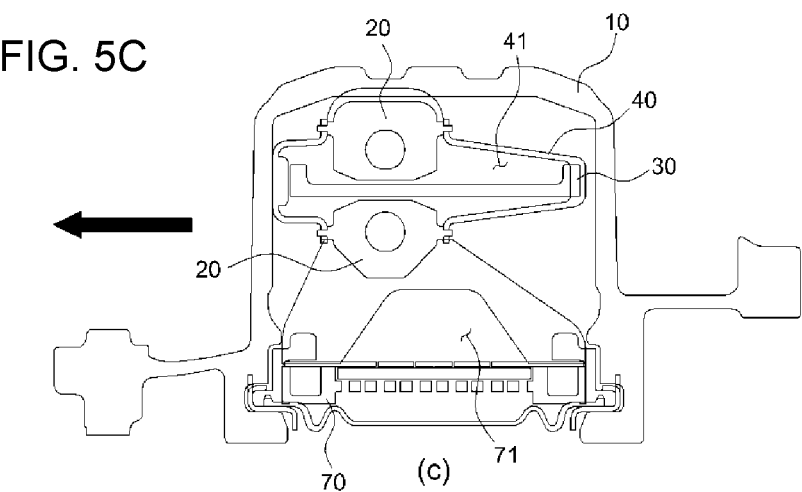
FIG. 5C illustrates an appearance of the hydraulic transmission mount of the present invention when the vehicle rapidly brakes.

FIG. 5C illustrates the behavior of the hydraulic transmission mount 1 of the present invention when the vehicle rapidly brakes. Referring to FIG. 5C, when the vehicle rapidly brakes while traveling in the arrow direction thereof, the core 20 is moved along the spoke 30 by inertial force in a direction in which the vehicle travels, and the stoppers 40 and the main rubber 50 connected to the core 20 may be deformed.

Similar to the time of the sudden unintended acceleration, the one side stopper 40 is extended, and the other side stopper 40 is compressed, but the horizontal length of the spoke 30 in the stoppers 40 is maintained because the material of the spoke 40 is not deformed in accordance with the behavior of the vehicle, such that the deformation of the stoppers 40, which surround the spoke 30, is also restricted.

Therefore, despite the rapid braking of the vehicle, the spoke 30 maintains the horizontal gap between the bracket 10 and the stopper 40 so that the gap is similar to the gap when the vehicle is stopped.

That is, despite the sudden unintended acceleration or the rapid braking of the vehicle, the spoke 30 prevents the horizontal gap between the bracket 10 and the stopper 40 from being greatly changed, preventing the stoppers 40 from colliding again with the other side of the bracket 10 through a long stroke after colliding with one side of the bracket 10.

Figure 6A:
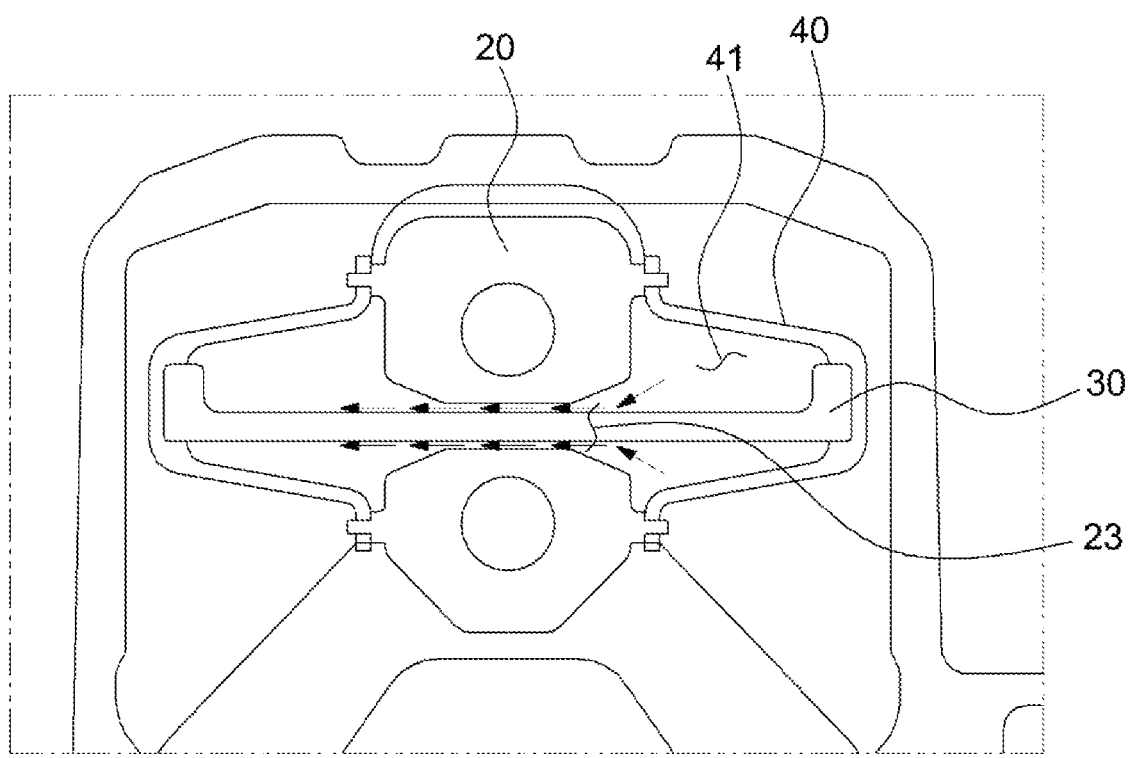
FIG. 6A illustrates behavior of a liquid in a liquid chamber of the present invention when the vehicle slowly accelerates.

FIG. 6A illustrates behavior of the liquid in the liquid chamber 41 of the present invention when the vehicle slowly accelerates. The arrow in FIG. 6A illustrates a flow of the fluid. Referring to FIG. 6A, when the vehicle softly starts moving or slowly brakes at a low speed, the fluid in the liquid chamber 41 flows slowly.

In the instant case, low resistance occurs due to the slow flow of the fluid, and the transmission mount is easily deformed even by small impact, such that vibration is isolated as the mount is deformed, and as a result, it is possible to improve an isolation performance and provide a driver with soft drive quality.

Figure 6B:
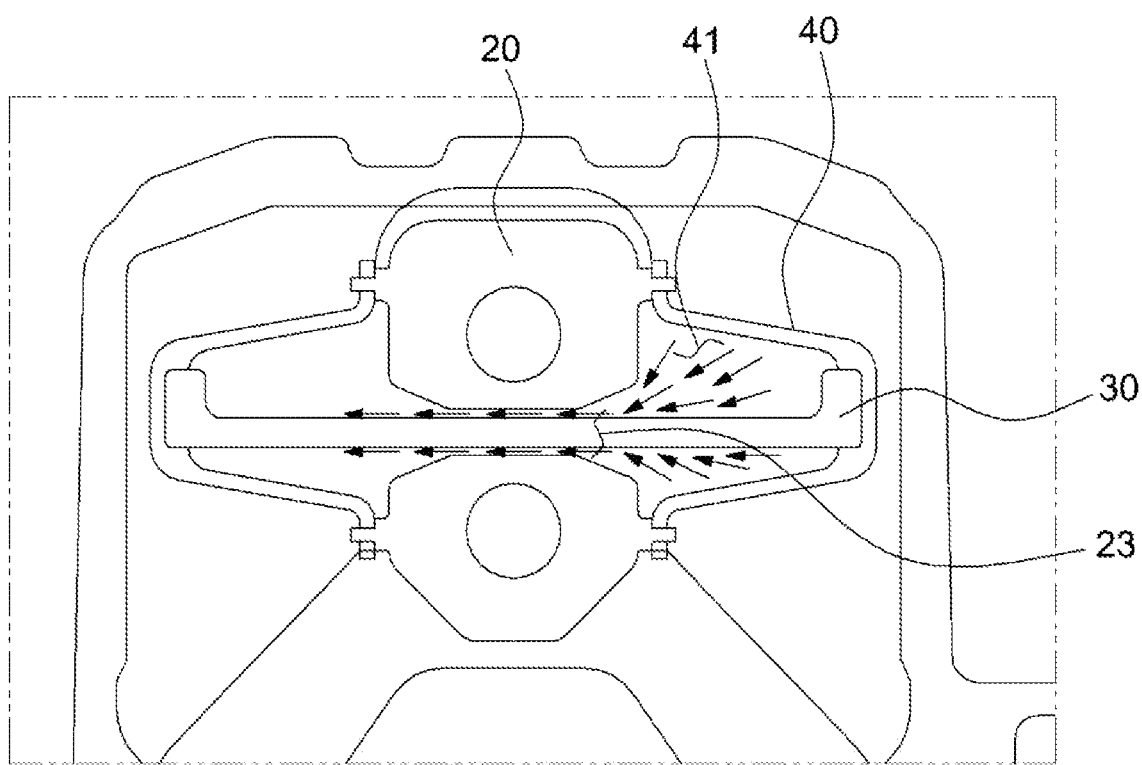
FIG. 6B illustrates behavior of the liquid in the liquid chamber of the present invention when the vehicle rapidly accelerates.

FIG. 6B illustrates behavior of the liquid in the liquid chamber 41 of the present invention when the vehicle rapidly accelerates. The arrow in FIG. 6B illustrates a flow of the fluid. Referring to 6B, when the vehicle rapidly starts moving or rapidly brakes, the fluid in the liquid chamber 41 flows very fast.

In the instant case, high resistance occurs due to the fast flow of the fluid, and the hydraulic transmission mount 1 is not easily deformed even by large impact.

Instead of the deformation of the hydraulic transmission mount 1, torque generated from the engine enables a tire to move fast, and the tire transmits high torque to the ground surface, facilitating a sports mode that allows the driver to feel high acceleration.

That is, a flow speed of the fluid varies in accordance with an acceleration situation of the vehicle, and an operation mode may vary by use of the situation in which resistance of the fluid varies in accordance with the variation of the flow speed of the fluid.

Figure 7A:
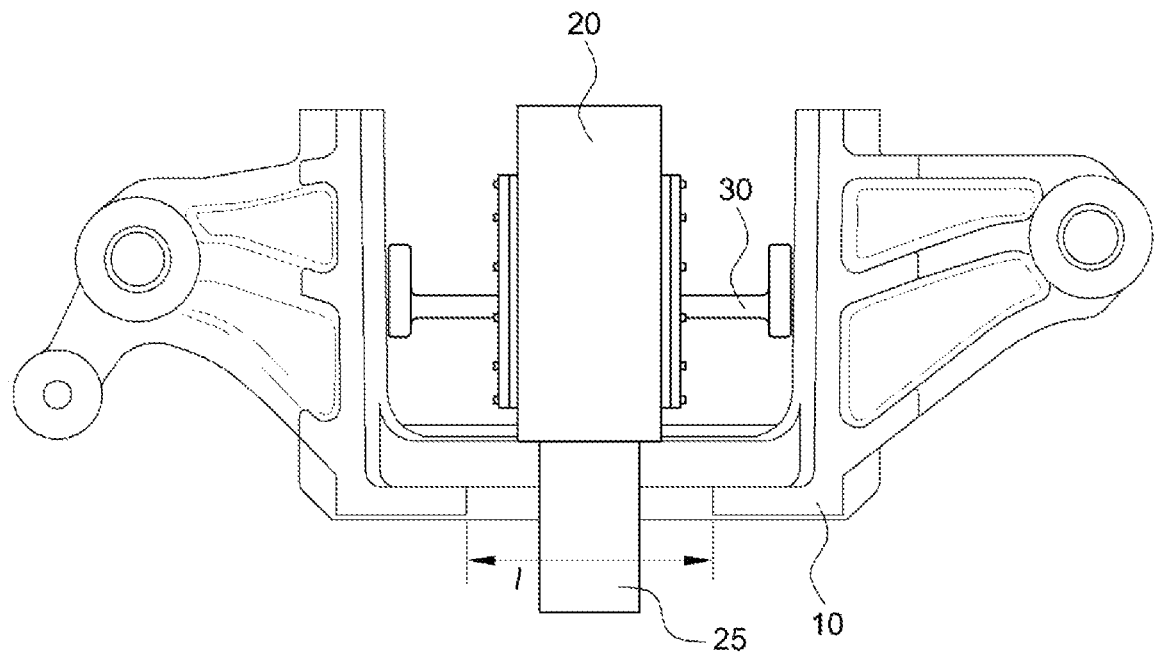
FIG. 7A illustrates a state in which a spoke of the present invention is coupled to the core when viewed from the top side thereof.

FIG. 7A illustrates a state in which the spoke 30 in an exemplary embodiment of the present invention is coupled to the core 20 when viewed from the top side thereof. Referring to FIG. 7A, the spoke 30 penetrates the core 20, and a connecting portion 25 is coupled to the transmission and enters or exits from a core entrance 1 in accordance with the motion of the transmission.

Figure 7B:
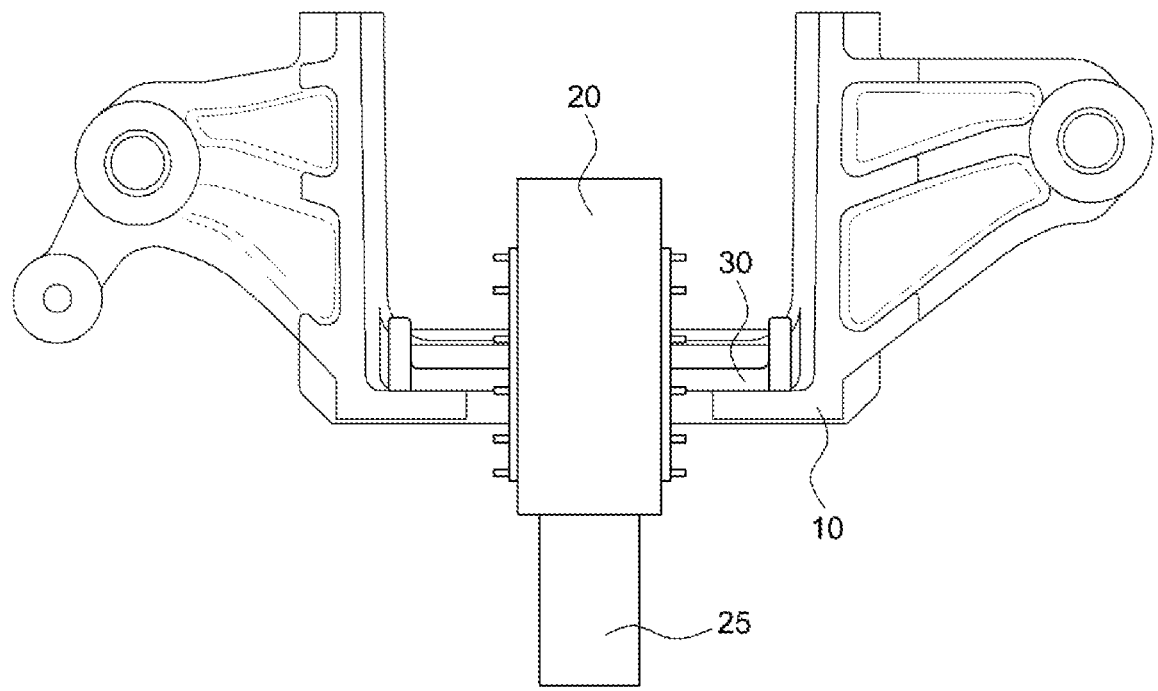
FIG. 7B illustrates a state in which the spoke of the present invention prevents the core from being withdrawn from a bracket at the time of a collision of the vehicle.

FIG. 7B illustrates a state in which the spoke 30 in an exemplary embodiment of the present invention prevents the core 20 from being withdrawn from the bracket 10 at the time of a vehicle collision. Referring to FIG. 7B, at the time of a vehicle collision, as the transmission moves, the core 20 coupled to the transmission moves together with the transmission in the movement direction of the transmission. In the instant case, if the core 20 is withdrawn from the bracket 10, a collision performance of the vehicle may greatly deteriorate.

Therefore, to prevent the core 20 from being withdrawn from the bracket 10, the spoke 30 may have a predetermined length greater than a width of the core entrance 1 formed in the bracket 10 so that the spoke 30 resists the bracket 10 when the core 20 moves.

Therefore, the spoke 30 prevents the core 20 from being withdrawn from the bracket 10, and the stopper 40, the main rubber 50, and the like, which are coupled to the core 20, are not withdrawn from the bracket 10, such that a collision performance of the vehicle may be improved.

Regarding the present invention related to the hydraulic transmission mount 1, a method of manufacturing the hydraulic transmission mount 1 will be described in a step-by-step manner.

FIG. 8 illustrates a flowchart of a method of manufacturing the hydraulic transmission mount 1 of the present invention. Referring to FIG. 8, the method of manufacturing the hydraulic transmission mount 1 may include: a first step S10 of die-casting the core 20 which is configured to move horizontally in accordance with the behavior of the vehicle; a second step S20 of vulcanizing the main rubber 50 so that the main rubber 50 surrounds the core 20; a third step S30 of inserting and assembling the divided spoke 30 into the insertion hole 23 formed at a center of the core 20; and a fourth step S40 of forming the hermetic liquid chamber 41 in the stoppers 40 by coupling the stopper 40 and the core 20 in the liquid.

Figure 9:
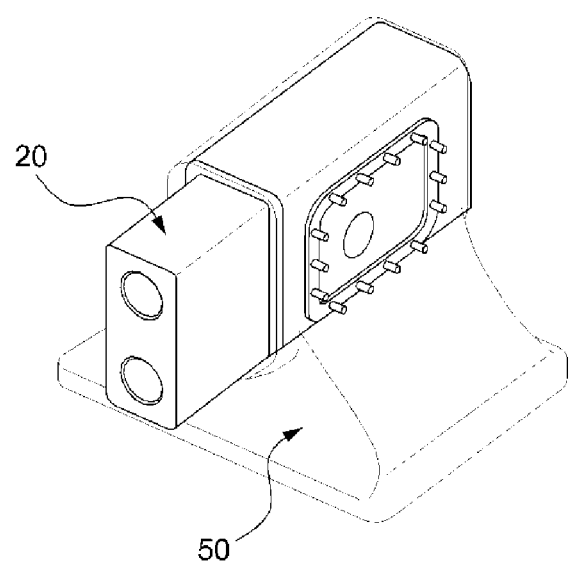
FIG. 9 illustrates a state in which a main rubber is vulcanized outside the core of the present invention.

FIG. 9 illustrates a state in which the main rubber 50 is vulcanized outside the core 20 of the present invention.

The core 20 may be manufactured by die-casting an aluminum material. The die casting is also called metal casting and refers to a precise casting method that obtains a casted product identical in shape to a mold by injecting molten metal into the mold made of steel which is accurately machined to have a shape perfectly coincident with a required casting shape. The die casting manufactures a product with an accurate dimension and thus has an advantage in that it is not necessary to finish the product, and the die casting enables mass production because the die casting manufactures products with excellent mechanical properties.

During the die-casting of the core 20, a mold may be manufactured so that the coupling protrusions 21 are formed on both surfaces of the core 20 and the insertion hole 23 is formed at the center of the core 20.

Figure 10A:
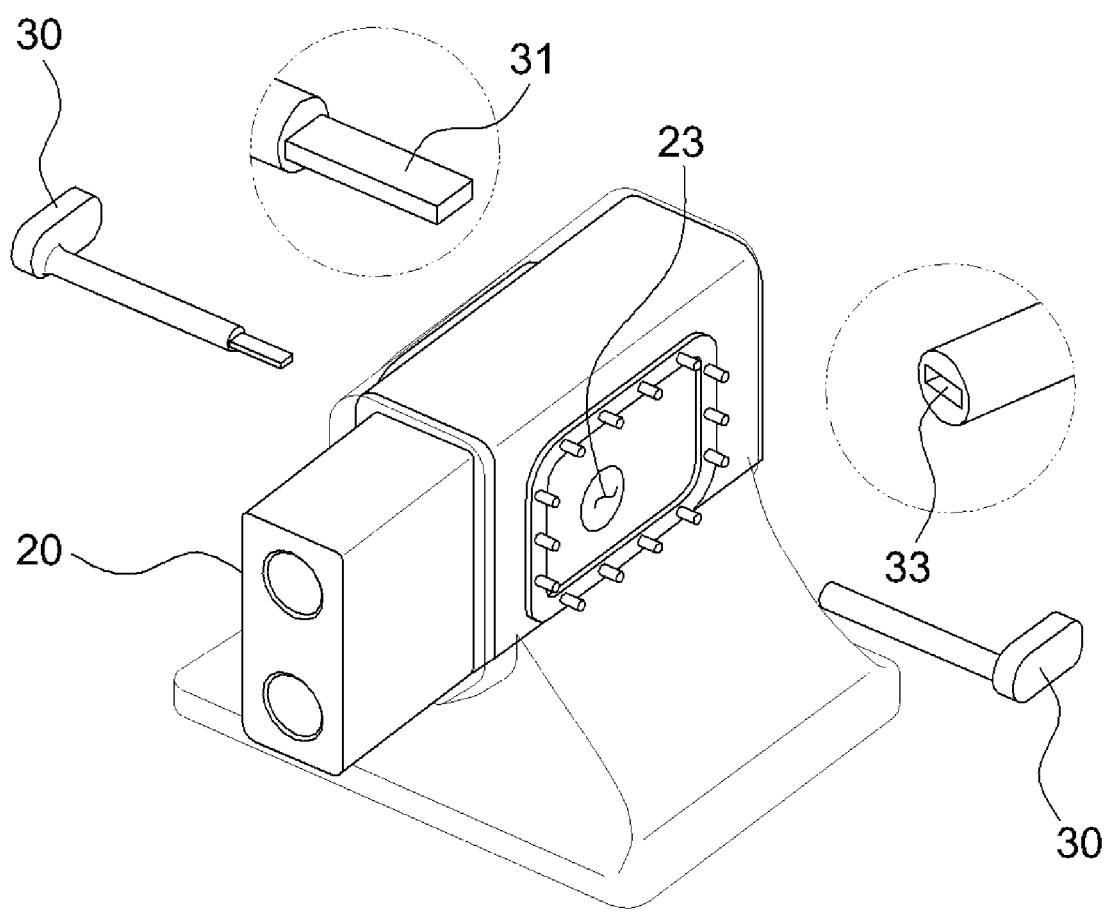
FIG. 10A illustrates a state in which the spoke is inserted into an insertion hole of the present invention.
Figure 10B:
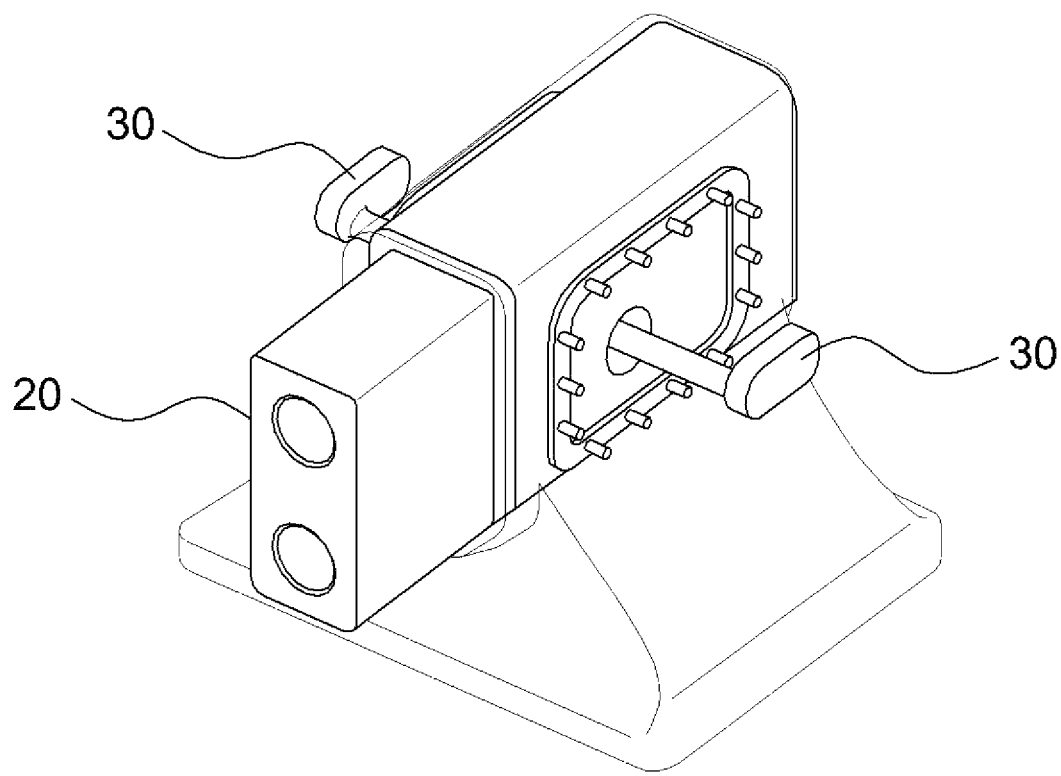
FIG. 10B illustrates a state in which the spoke of the present invention is inserted and assembled into the insertion hole.

FIG. 10A and FIG. 10B illustrate a state in which the spoke 30 is inserted into the insertion hole 23 of the present invention. Referring to FIG. 10A, the divided parts of the spoke 30 may be inserted into the insertion hole 23 of the core 20 in opposite directions from both sides of the core 20 and then coupled to each other.

One portion of the spoke 30, which is inserted into the insertion hole 23 from one side of the insertion hole 23, may have an assembling protrusion 31 at one end portion directed toward the insertion hole 23, and the other portion of the spoke 30, which is inserted into the insertion hole 23 from the other side of the insertion hole 23, may have an assembling groove 33 at one end portion directed toward the insertion hole 23.

Referring to FIG. 10B, the assembling protrusion 31 and the assembling groove 33 are assembled, and the spoke 30 is inserted into the insertion hole 23, such that the core 20 may support the spoke 30. The core 20 moves along the spoke 30. In the instant case, an external surface of the spoke 30 may be coated with rubber with a thickness of about 0.5 mm to prevent abnormal noise caused by friction with the core 20.

Figure 11:
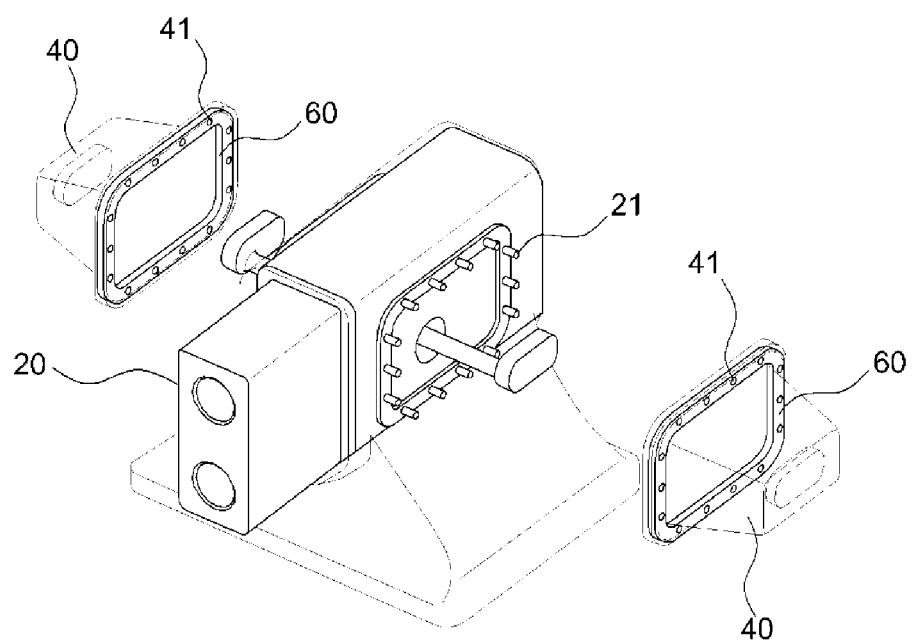
FIG. 11 illustrates a state in which the stopper and the steel plate of the present invention are coupled to the core.

FIG. 11 illustrates a state in which the stoppers 40 and the steel plates 60 in an exemplary embodiment of the present invention are coupled to the core 20. Referring to FIG. 11, the cross section of the steel plate 60 has the same shape as the cross section of the stopper 40, and the cross section of the steel plate 60 is smaller than the cross section of the stopper 40, such that the steel plate 60 may be fitted into the stopper 40 without a gap.

The coupling holes 61 of the steel plate 60 are matched with the coupling protrusions 21 of the core 20 in a state in which the core 20 is submerged in the liquid, and the coupling holes 61 and the coupling protrusions 21 are fastened with rivets. In the instant case, the stoppers 40 are coupled to both surfaces of the core 20, such that the liquid may be encapsulated in the hermetic space in the stopper 40.

Figure 12A:
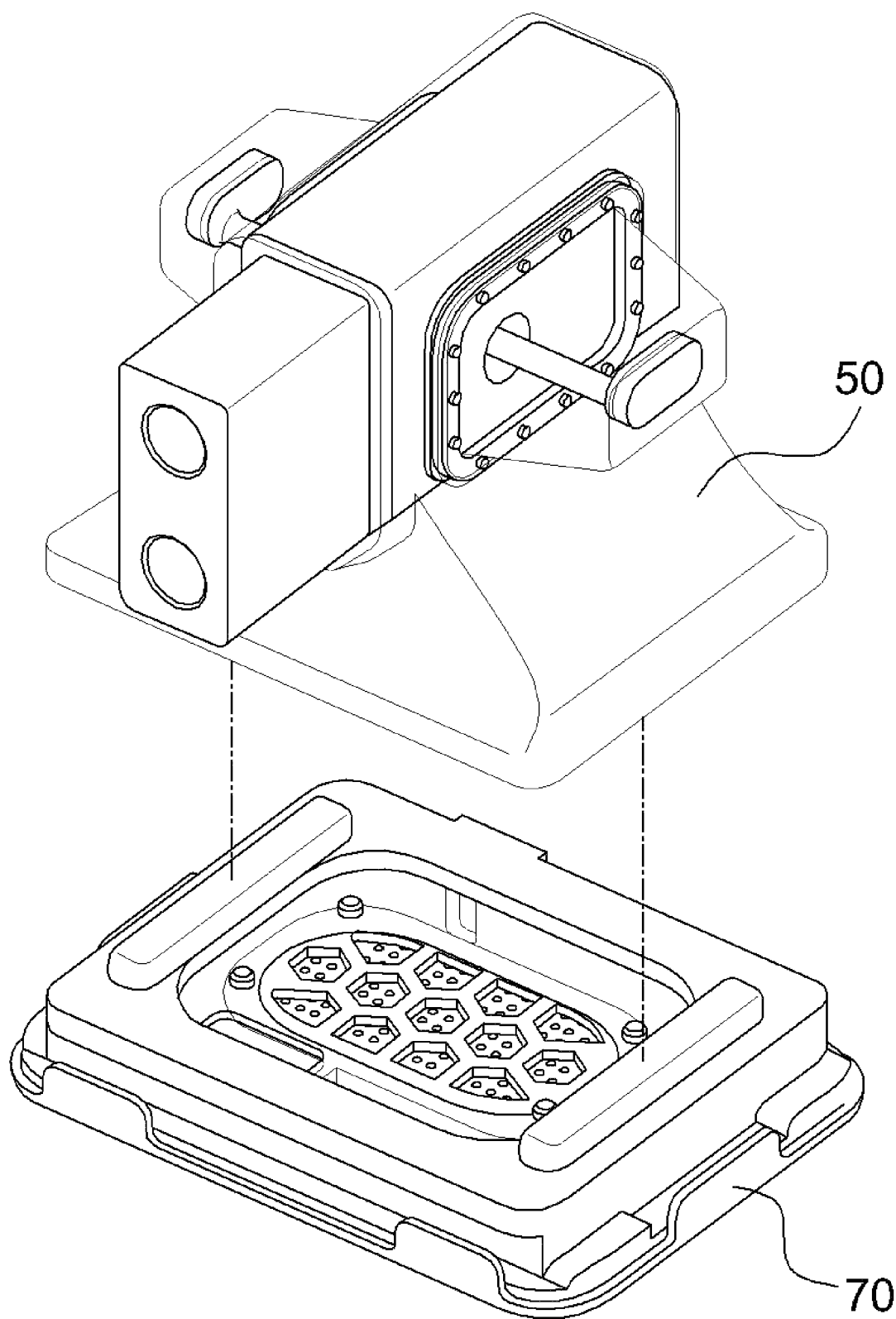
FIG. 12A and FIG. 12B illustrate a state in which a floor plate is coupled to the main rubber of the present invention.
Figure 12B:
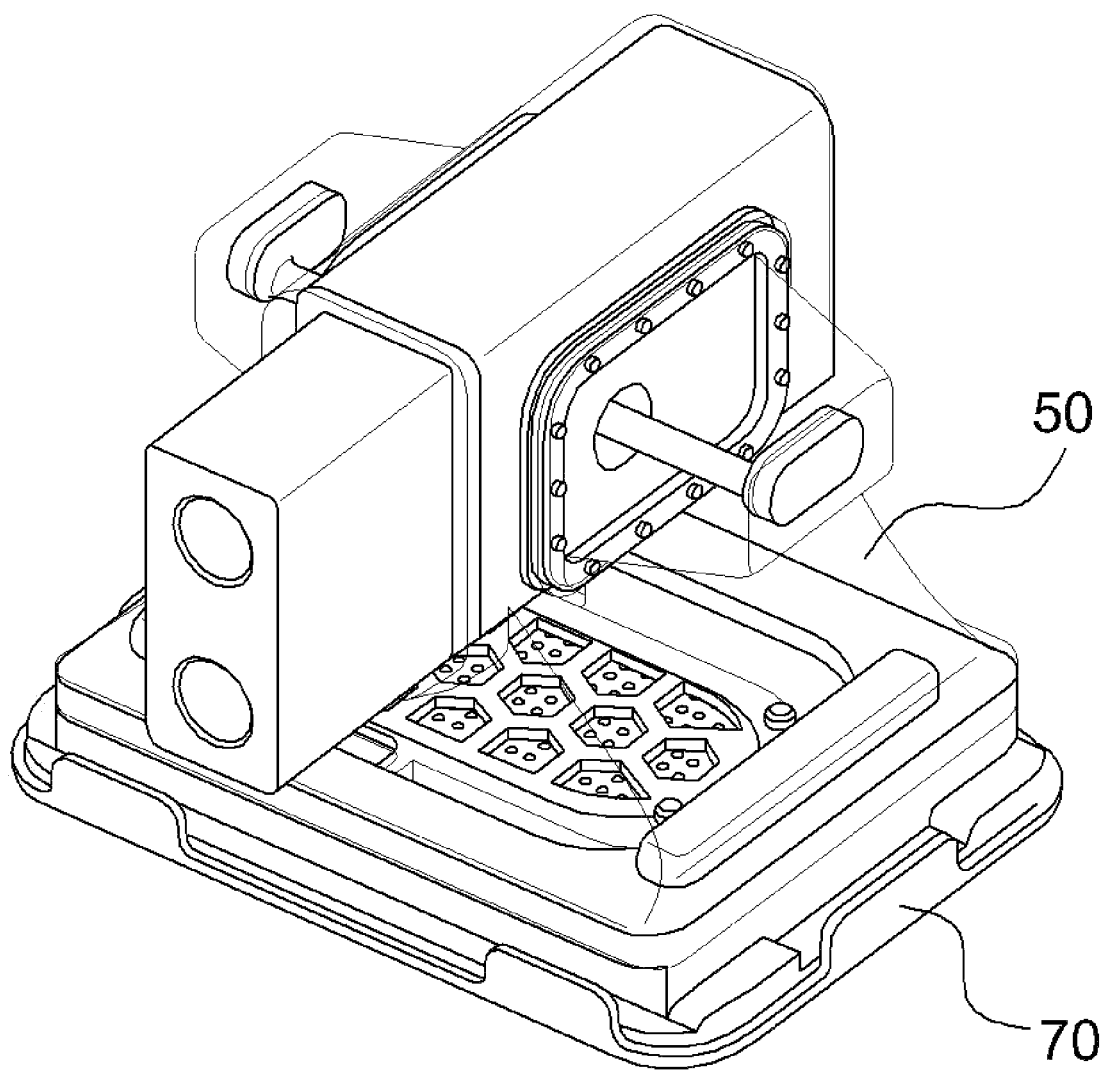

FIG. 12A and FIG. 12B illustrate a state in which a floor plate 70 is coupled to the main rubber 50 of the present invention. Referring to FIG. 12A and FIG. 12B, the floor plate 70 mounted in the bracket 10 may be coupled to a lower end portion of the main rubber 50 so that the fluid is encapsulated between the main rubber 50 and the floor plate 70.

The floor plate 70 and the main rubber 50 define the lower liquid chamber 41 and a lower liquid chamber 71 enclosed by bridges 80 of the main rubber 50 which are connected to a lower portion of the core 20. The bridges 80 of the main rubber 50 include a first bridge 810 and a second bridge 820 connected to the floor plate 70 and the lower liquid chamber 41 is formed by the first bridge 810, the second bridge 820 and the floor plate 70.

In an exemplary embodiment of the present invention, the floor plate 70 and a bottom plate 85 are spaced with a gap. Accordingly, vibration of the vehicle may be isolated and impact may be reduced by frictional force of the fluid in the liquid chambers 71 and 41.

Figure 13:
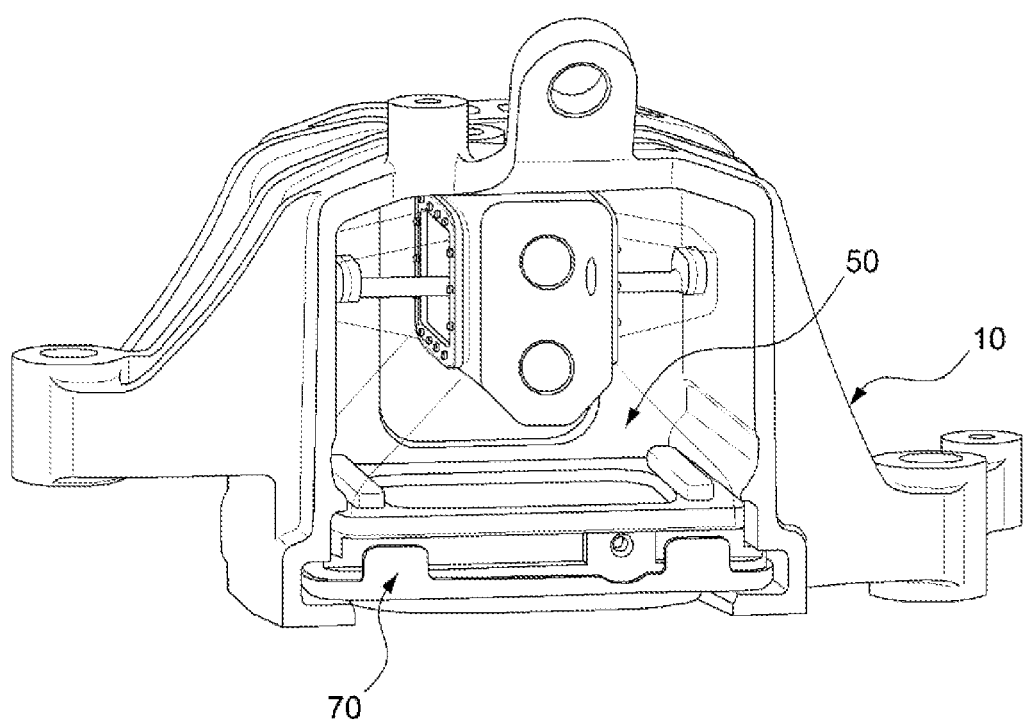
FIG. 13 illustrates a state in which the main rubber to which the floor plate of the present invention is coupled is press-fitted into the bracket.

FIG. 13 illustrates a state in which the main rubber 50 to which the floor plate 70 in an exemplary embodiment of the present invention is coupled is press-fitted into the bracket 10.

A material of the bracket 10 is metal such as iron or aluminum, and the hydraulic transmission mount 1 may be fixed to the vehicle body by the bracket 10.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A hydraulic transmission mount which isolates noise or vibration of an engine, the hydraulic transmission mount comprising:

a core which moves horizontally with a main rubber vulcanized outside the core in accordance with movement of a vehicle;

stoppers which are coupled to a first surface and a second surface of the core and define a liquid chamber with the core;

a bracket which surrounds the stoppers and fixes the hydraulic transmission mount to a vehicle body; and a spoke which penetrates an insertion hole formed at a center of the core and is in contact with the stoppers, wherein a fluid encapsulated in the liquid chamber flows through the insertion hole in accordance with the movement of the vehicle, and wherein the spoke has a predetermined length to prevent the core from being withdrawn from the bracket.

2. The hydraulic transmission mount of claim 1, wherein the stoppers are deformed by a movement of the core that occurs in accordance with the movement of the vehicle.

3. The hydraulic transmission mount of claim 1, wherein the stoppers include a first stopper and a second stopper, wherein the liquid chambers include a first liquid chamber enclosed by the core and the first stopper and a second liquid chamber enclosed by the core and the second stopper, and wherein the first liquid chamber and the second liquid chamber fluidically-communicate with each other through the insertion hole.

4. The hydraulic transmission mount of claim 3, wherein the spoke is mounted through the insertion hole, and wherein a first end of the spoke is connected to the first stopper and a second end of the spoke is connected to the second stopper.

5. The hydraulic transmission mount of claim 1, wherein the main rubber includes bridges and a lower liquid chamber is formed to be enclosed by the bridges connected to a portion of the core.

6. The hydraulic transmission mount of claim 5, wherein the bridges include a first bridge and a second bridge connected to a floor plate, and wherein the lower liquid chamber is formed by the first bridge, the second bridge and the floor plate.

7. The hydraulic transmission mount of claim 6, further including a bottom surface connected to the bracket, wherein the floor plate is disposed inside the bracket with a gap with the bottom surface.

8. The hydraulic transmission mount of claim 1, wherein a plurality of coupling protrusions is formed on a first surface and a second surface of the core.

9. The hydraulic transmission mount of claim 8, further including:

steel plates which have coupling holes to be coupled to the coupling protrusions and are coupled between the core and the stoppers.

10. The hydraulic transmission mount of claim 1, wherein the spoke maintains a horizontal gap between the bracket and the stoppers.

11. The hydraulic transmission mount of claim 1, wherein the spoke has protruding regions that are bent at first and second end portions of the spoke and in contact with the stoppers.

12. A method of manufacturing a hydraulic transmission mount that isolates noise or vibration of an engine, the method comprising:

die-casting a core that moves horizontally in accordance with movement of a vehicle;

vulcanizing a main rubber so that the main rubber surrounds the core;

inserting and assembling a divided spoke into an insertion hole formed at a center of the core; and forming a liquid chamber in stoppers by coupling the stoppers and the core in a liquid, wherein the divided spoke has a predetermined length to prevent the core from being withdrawn from a bracket.

13. The method of claim 12, wherein the inserting and assembling of the divided spoke into the insertion hole formed at the center of the core includes coupling and assembling a first portion of the divided spoke formed with an assembling protrusion and a second portion of the divided spoke formed with an assembling groove.

14. The method of claim 12, further including:

coupling steel plates to the core after the inserting and assembling of the divided spoke into the insertion hole formed at the center of the core.

15. The method of claim 12, further including:

coupling a floor plate to the main rubber and press-fitting the main rubber into the bracket after the forming of the liquid chamber in the stoppers by coupling the stoppers and the core in the liquid.

\* \* \* \* \*